G. HALL.
Broadcast-Seeder.
No. 16,542.
Patented Feb. 3, 1857.
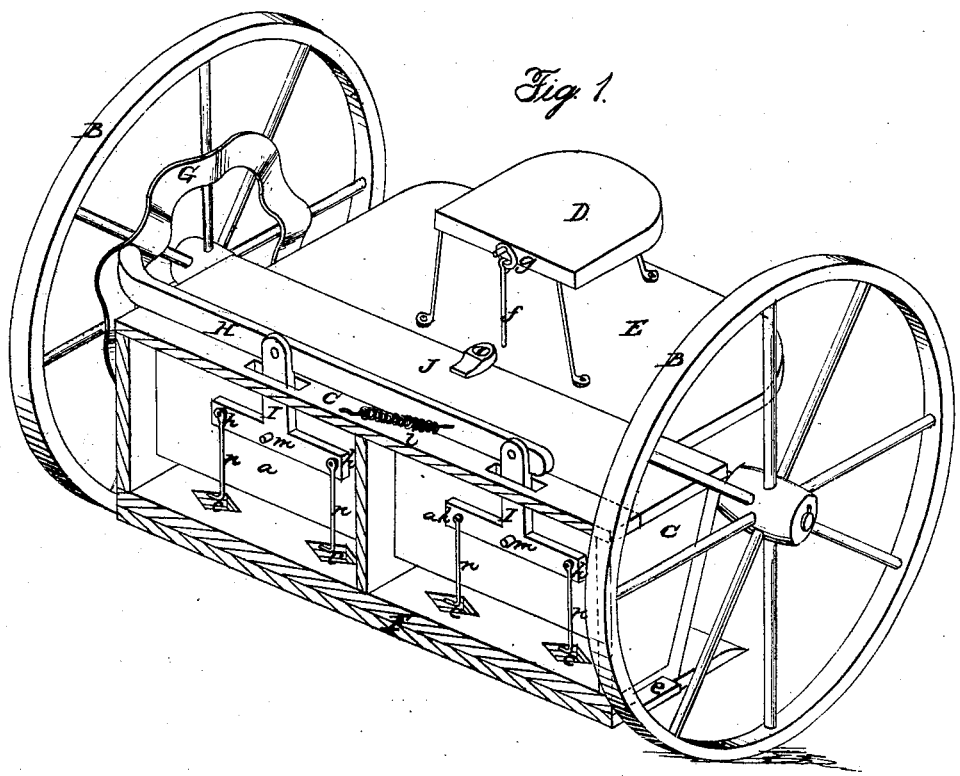
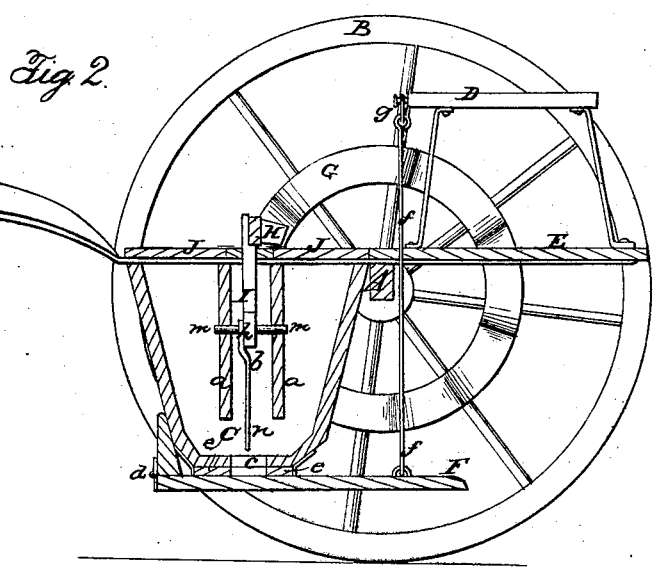

UNITED STATES PATENT OFFICE.

GEORGE HALL, OF MORGANTOWN, VIRGINIA.

IMPROVEMENT IN MACHINES FOR SOWING SEED BROADCAST.

Specification forming part of Letters Patent No. 16,542, dated February 3, 1857.

*To all whom it may concern:*

Be it known that I, GEORGE HALL, of Morgantown, in the county of Monongalia and State of Virginia, have invented certain new and useful Improvements in Machines for Sowing Seed Broadcast; and I do hereby declare the following to be a full, clear, and exact description of the same, reference being had to the accompanying drawings, making a part thereof, in which—

Figure 1 represents a perspective view of the machine with the front of the seed-hopper removed to show the agitators within the hopper. Fig. 2 represents a vertical cross-section through the machine.

Similar letters of reference, where they occur in the separate figures, denote like parts of the machine in both.

The nature of my invention consists in combining with the vertical rods or fingers which force the seed through the openings in the hopper a hinged dash-board, which can be so adjusted as to equalize the amount of grain that slides over it, whether the machine be going up or down an inclination or upon level ground, or shut it off entirely, as will be explained.

To enable others skilled in the art to make and use my invention, I will proceed to describe the same with reference to the drawings.

A is an axle supported in the two wheels B B, said axle being a fixture, and the wheels turning on instead of with the axle. Upon one side of this axle is placed the seed-hopper C, and upon the other side, so as to balance the whole weight on the axle, or nearly so, is placed the driver's seat D on a platform, E. The hopper C has two dividing-boards, $a\,a$, in it, running longitudinally the whole length of the hopper, so as to leave a space or chamber, $b$, between them, in which the agitators or fingers work without being encumbered with the grain in the hopper, which lies on either side of these partitions $a\,a$. The dividing-boards or partitions $a\,a$ do not extend clear down to the bottom of the hopper, but space enough is left underneath them to allow the grain from either or both depositories in the hopper to run toward the exit-openings $c\,c$, which are of diamond form. An adjustable seed-slide, $e$, is underneath the bottom of the hopper, and it also has diamond-shaped openings through it, and so arranged that one set of openings may be more or less closed by the other set, to regulate the quantity that can pass through them.

Hinged underneath the hopper, at $d$, is a dash-board, F, which projects rearward sufficiently far to deliver or drop the grain at the after part of the machine. From this dash-board F a rod, $f$, extends up to the driver's seat, so that by said rod $f$ the dash-board may be brought up close against the under part of the hopper, as shown in Fig. 2, and thus entirely prevent any seed from escaping therefrom; or it may be dropped clear down until the ring $g$ comes against the platform E, in which position the inclination of the dash-board may be suitable for delivering grain when the machine is going downhill, and the rear of the dash-board would be raised up. For level ground the inclination need not be so much, and the operator can raise the dash-board to suit it. In going uphill the inclination should be still less, and the dash-board raised higher. Thus the machine is made readily adaptable to all the circumstances that can take place in using it in hilly ground.

On one of the wheels B is a cam-ring, G, having any suitable number of cam-projections on it, against which a bar, H, is held by a spiral spring, $i$, and the turning of the wheel B gives a reciprocating motion to said bar. On this bar H are pivoted two bell-crank levers, I, said levers being also pivoted at $m$ to the division-boards $a$, and upon each of the horizontal arms $h\,h$ of the lever I is arranged a stirring-finger, $n$, which works up and down through the hole $c$, immediately underneath it, every time the lever I is rocked on its fulcra at $m$. These fingers $n$ may have their lower ends slightly turned up or bent, so that they will not only stir the seeds through the holes $c$, but if the seeds should become clogged in said holes they would also raise them up and loosen them, and thus keep the seed-holes free. Although these fingers $n$, while working, run through the holes in the bottom of the hopper, yet when standing at rest, as in Fig. 1, they do not pass into them, and in this position the seed-slide $e$ can be moved at any time to adjust the exit-holes without coming in contact with said fingers.

The lids J J of the hopper may be hinged to afford ready access thereto to fill them with grain.

Having thus fully described the nature of my invention, what I claim in a broadcast seed-sowing machine is—

The combination of the hinged and adjustable dash-board with the working-fingers n and exit-openings c for the purpose of taking the grain from the hopper and scattering it broadcast, substantially as herein set forth.

GEORGE HALL.

Witnesses:
 ISAAC SCOTT,
 JOHN FORDYCE.